United States Patent Office 2,903,357
Patented Sept. 8, 1959

2,903,357

BACITRACIN PRODUCT AND PROCESSES UTILIZING NICKEL COMPOUNDS

Ralph Allan Zorn, Muscatine, Iowa, assignor to Grain Processing Corporation, Muscatine, Iowa, a corporation of Iowa No Drawing. Application June 13, 1958
Serial No. 741,727

8 Claims. (Cl. 99—2)

This invention relates to a bacitracin product and the process for preparing the same.

It is well known that bacitracin may be prepared by the cultivation of microorganisms and particularly *Bacillus subtilis*. This antibiotic has recently found considerable application in preparation of feeds for poultry and livestock. Thus when bacitracin is incorporated into feeds, a marked stimulation of the growth of the poultry or livestock is observed.

One difficulty with bacitracin is, however, that it is unstable under ordinary conditions of storage. Also in the production of bacitracin by fermentation methods a considerable amount of the bacitracin may be lost during the normal process of recovery, which process usually involves the steps of evaporating and drum-drying the fermentation mash.

Accordingly, it is an object of this invention to provide a bacitracin composition which has a high degree of stability upon storage.

A further object of this invention is the provision of an animal feed supplement containing bacitracin which has been stabilized against deterioration upon storage even under the conditions of high humidity.

A still further object of this invention is the provision of a process for recovering bacitracin in a manner which permits a high percentage of recovery with small losses as compared to prior art recovery procedures.

Further and additional objects will appear from the following description and the accompanying claims.

In accordance with one embodiment of this invention it has been found that an improved bacitracin-containing product may be prepared by adding thereto a small amount of a water-soluble compound of nickel. The nickel serves to stabilize the bacitracin against deterioration on storage. The invention is particularly useful in the preparation of animal feed supplements which contain a nutrient base and bacitracin. In this instance the bacitracin has also been treated with a water-soluble nickel salt in order to stabilize the bacitracin in the feed product.

This invention has particular utility in the treatment of fermentation mashes for the recovery of bacitracin. Thus in accordance wih this invention, the fermentation mash containing the bacitracin is treated with a small amount of a water-soluble nickel salt prior to the time that the fermentation mash is evaporated and drum-dried. It has been discovered that by the incorporation of nickel salt in this manner only a comparatively small amount of bacitracin is lost in the subsequent concentrating and drying procedures.

For a more complete understanding of this invention, reference will now be made to a specific example. It will be understood, of course, that the invention is not to be limited to the specific example given since it will be apparent that many modifications may be made without departing from the spirit and scope of the invention.

An aqueous fermentation medium was prepared containing 7.5 percent soybean flour, 2.0 percent cornstarch, 1.0 percent calcium carbonate, and 0.33 percent magnesium sulfate. This medium was sterilized by conventional techniques and was then inoculated with one-half volume percent of a 24-hour liquid culture of *Bacillus subtilis*. The inoculated medium was then incubated at about 30° C. under constant aeration conditions for a period of 30 hours. At the end of the fermentation period the pH was about 8.1.

After the fermentation had been completed, 1.0 percent by weight of nickel sulfate was added to the liquid fermentation mash and thereafter the fermentation mash was concenrated in a conventional evaporator and then drum dried. This product is suitable for sale to feed manufacturers as such or it may be standardized to a predetermined bacitracin potency utilizing corn meal, soybean meal, or other nutrient diluent. Thus, one suitable feed supplement is one in which about equal parts of drum-dried material and corn meal are blended to produce a product containing 10 grams of bacitracin per pound of feed supplement.

A characteristic of the drum-dried material and of the feed supplement is that the bacitracin contained therein is very stable under storage conditions. This is particularly important where the bacitracin is employed in feeds that may be stored for some time before being consumed.

It has been determined that the nickel provides the storage stability for the bacitracin. At the present time it is not known in what manner the nickel acts to stabilize the bacitracin. For example, it is not known whether the nickel forms a salt or a complex with the bacitracin materials. It can only be stated at the present time that the nickel serves as a stabilizing agent.

In the foregoing example nickel sulfate has been referred to as the specific compound which was the vehicle for the incorporating nickel into the bacitracin. However, it will be apparent that any of the nontoxic water-soluble salts of nickel may be included, such as nickel chloride, nickel acetate, nickel iodide, nickel nitrate, nickel propionate and the like. Generally speaking, the amount of nickel employed should be between about 0.1 percent and 5.0 percent of the weight of the fermentation mash treated with it. Preferably, however, this range is between 0.3 percent and 2.0 percent. Expressed in terms of bacitracin potency, the concentration of nickel employed should be between about 0.4 percent and 200 percent of the weight of bacitracin.

In the foregoing example one particular fermentation medium is referred to. However, it will be apparent to one skilled in the art that there may be variations in this regard and that any fermentation medium known to be suitable for producing bacitracin by *Bacillus subtilis* may be included. The important ingredients are, of course, water, metabolizable carbohydrate and a nitrogen source such as assimilable protein.

While a particular embodiment of this invention has been described in the foregoing, it will, of course, be apparent that the invention is not to be limited thereto but rather is to be restricted only by the scope of the appended claims.

I claim:

1. A composition comprising bacitracin having added thereto a small amount of a water-soluble compound of nickel.

2. An animal feed supplement comprising a nutrient substance and bacitracin having a water-soluble nickel salt incorporated therewith.

3. In a process for recovering bacitracin, the steps, of adding a water-soluble nickel salt to a bacitracin-containing aqueous fermentation mash and thereafter removing water from said mash by evaporation.

4. A composition comprising bacitracin having added thereto a water-soluble compound of nickel, the nickel concentration in said composition being between about 0.4 and 200 percent of the weight of bacitracin therein.

5. A composition comprising bacitracin having added thereto a water-soluble, nontoxic nickel salt, the nickel concentration in said composition being between about 0.4 and 200 percent of the weight of the bacitracin therein.

6. An animal feed supplement comprising a nutrient substance and bacitracin having a water-soluble nickel salt incorporated therewith, the nickel concentration in said supplement being between about 0.4 and 200 percent of the weight of the bacitracin therein.

7. In a process for recovering bacitracin, the steps of adding a water-soluble nickel salt to a bacitracin-containing aqueous fermentation mash, the amount of nickel so added being between about 0.1 and 5.0 percent of the weight of said mash, and thereafter removing water from said mash by evaporation.

8. In a process for recovering bacitracin, the steps of adding a nontoxic, water-soluble nickel salt to a bacitracin-containing aqueous *Bacillus subtilis* fermentation mash, the amount of nickel so added being between about 0.3 and 2.0 percent of the weight of said mash, and thereafter removing water from said mash by evaporation.

No references cited.